(No Model.)
P. GLASZER.
TWO WHEELED VEHICLE.
No. 387,350. Patented Aug. 7, 1888.
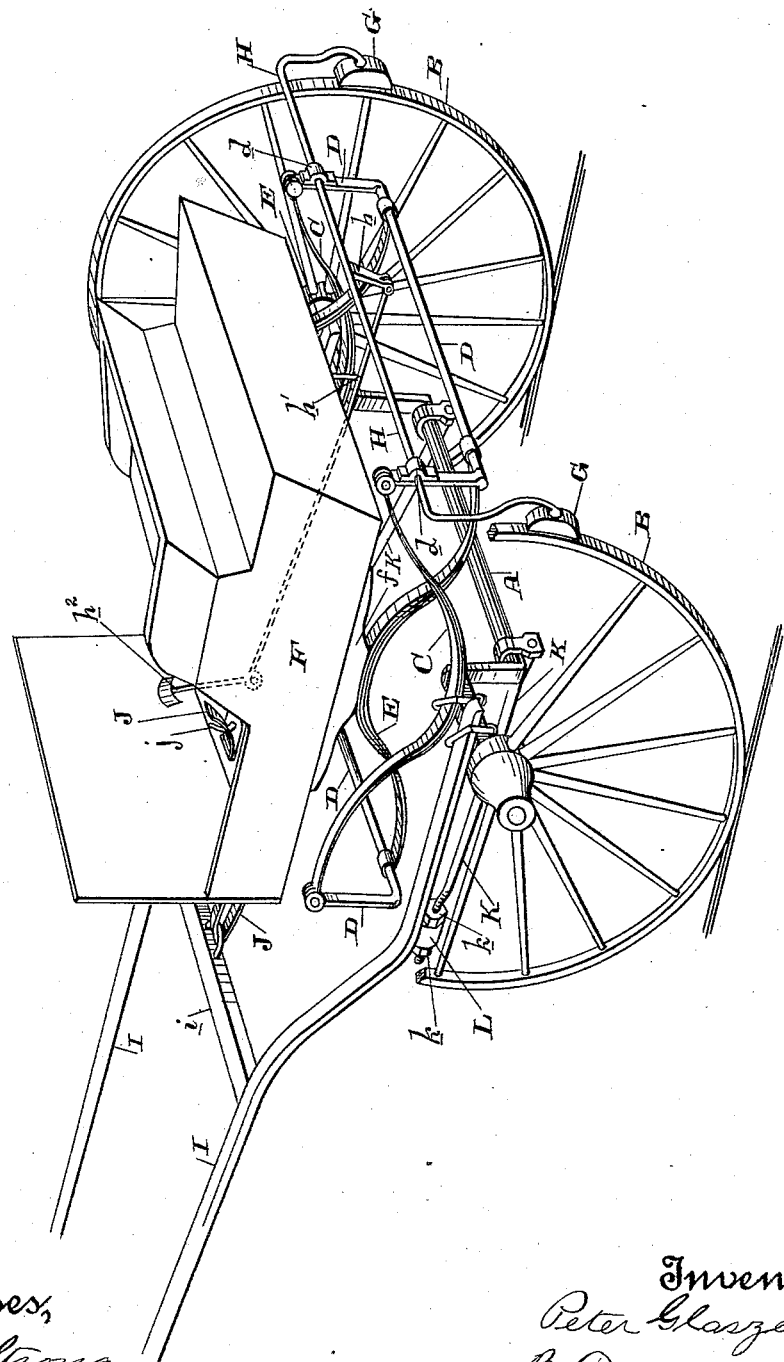
Witnesses,
Geo. H. Strong.
Inventor,
Peter Glaszer.
By Dewey & Co.
Attys.

UNITED STATES PATENT OFFICE.

PETER GLASZER, OF REDDING, CALIFORNIA.

TWO-WHEELED VEHICLE.

SPECIFICATION forming part of Letters Patent No. 387,350, dated August 7, 1888.

Application filed April 14, 1888. Serial No. 270,648. (No model.)

*To all whom it may concern:*

Be it known that I, PETER GLASZER, of Redding, Shasta county, State of California, have invented an Improvement in Two-Wheeled Vehicles; and I hereby declare the following to be a full, clear, and exact description of the same.

My invention relates to that class of two-wheeled vehicles commonly known as "carts;" and my invention consists in the novel spring-connection between the axle and the body, whereby the latter is permitted the required independence of movement to avoid having imparted to it the usual unpleasant motion due to the jogging of the horse; in the brake mechanism and its arrangement, whereby on a downgrade the weight on the back of the horse is relieved; an adjustable strap-connection of the front of the body with the cross-bar of the shafts, whereby on an upgrade the weight is thrown onto the horse's back; in the adjustable connection between the axle and the shafts, whereby the latter are regulated as to height to suit the height of the horse, and in details of construction, arrangement, and combination, all of which I shall hereinafter fully describe.

The object of my invention is to provide a vehicle of this class which is easy riding, because of the doing away with that unpleasant forward and back motion which the rider experiences in carts, and which is due to the up-and-down motion of the horse, and also to provide a vehicle which is easy on the horse and can be regulated to suit different sizes of horses.

Referring to the accompanying drawing for a more complete explanation of my invention, the figure is a perspective view of my vehicle.

A is the axle, of that pattern known as a "crank-axle," and B are the wheels. Rigidly clipped to the axle are the half springs C, curving upwardly to each end.

D represents hanger-frames, pivoted in each end of the springs C and extending between them. Pivoted to these hanger-frames or hangers are the half-springs E, curving upwardly to the center, where they support the body F through the intervention of the usual spring-blocks, $f$. It will now be seen that the body is so connected with the axle as to have an independent movement forward or back and up and down, inclining the hangers more or less, which said hangers should be long enough to have their lower ends come down to a plane below the level of the axle when the rider is in his seat. This practically transfers the supporting-points of the weight below the axle, which, in connection with the independent movement which the body is enabled to have, renders it steady under the weight of the occupant and unaffected by the rocking motion which the axle receives from the up-and-down movement of the shafts.

G represents the brake-blocks operating against the rear of the wheels. These blocks are carried by the rock crank-shaft H, journaled in bearings $d$ on the hangers, and operated in the usual manner by a crank-arm, $h$, a connecting-rod, $h'$, extending forwardly, and a lever, $h^2$, which may be a hand or foot lever, (here shown as a foot-lever,) in a convenient position in the foot portion of the body. The effect of this arrangement of the brakes is that when applied on a downgrade they pull the movable or swinging body back, so as to transfer the weight of the rider to a plane back of the axle, and thus relieve the weight on the back of the horse. This is an essential point in a hilly country, and renders the cart practical in localities where on account of the grades such a vehicle has heretofore been of but little service.

I represents the shafts clipped solidly to the axle, and $i$ is the usual cross-bar between them.

J is a strap connected with the cross-bar, and thence extending backwardly into the foot portion of the body, where, within convenient reach of the rider, it is provided with a buckle, a hook, or other adjusting device, $j$, whereby it may be pulled in or let out and secured in position where adjusted. The object of this strap is when on an upgrade to enable the rider to pull the movable or swinging body forward, so as to transfer the weight to a plane forward of the axle, and thus impose more weight on the horse's back.

K is a rod or link, the rear end of which is journaled or pivoted on the crank portion of the axle. Its forward end passes through an eye or socket, L, on the shaft, and is threaded to receive the nuts $k$, whereby it may be adjusted as to length between connections. The effect of this adjustment is to raise or lower the shafts to properly regulate them to the height of the horse.

Having thus described my invention, what I claim as new, and desire to secure by Letters Patent, is—

1. In a two-wheeled vehicle, the axle and the body, in combination with the spring-connection between them, consisting of the springs clipped solidly to the axle and curving upwardly to each end, the springs supporting the body and curving upwardly to the center, and the pivoted hangers connecting the ends of the body-supporting springs with the ends of the axle-springs, substantially as herein described.

2. In a two-wheeled vehicle, the axle, the shafts rigidly clipped thereto, and the body, in combination with the half-springs clipped solidly to the axle and curving upwardly to each end, the half-springs supporting the body and curving upwardly to the center, and the depending hanger-frames connecting the ends of the body-springs with the ends of the axle springs, substantially as herein described.

3. In a two-wheeled vehicle, the axle, the wheels, the body, and a swinging connection between the axle and body, whereby the body may have a movement forward and back, in combination with brakes operating against the rear of the wheels, whereby on a downgrade the weight on the horse's back may be relieved, substantially as herein described.

4. In a two-wheeled vehicle, the axle having the wheels and the body, in combination with the half-springs clipped to the axle, the half-springs supporting the body, and the pivoted hangers connecting the ends of the springs, whereby the body may have a movement forward and back, and the brakes operating against the rear of the wheels, whereby on a downgrade the weight on the horse's back may be relieved, substantially as herein described.

5. In a two-wheeled vehicle, the axle having the wheels and the body, in combination with the half-springs clipped to the axle, the half-springs supporting the body, and the pivoted hangers connecting the ends of the springs, whereby the body may have a movement forward and back, the rock crank-shaft carried by the rear hangers, the brake-blocks carried by the shaft and operating against the rear of the wheels, the operating-lever in the body, and the rod connecting it with the rock crank-shaft, whereby the brakes are actuated, substantially as and for the purpose herein described.

6. In a two-wheeled vehicle, the axle, the body, and a swinging connection between them, whereby the body may have a movement forward and back, and the shafts clipped to the axle, in combination with an adjustable connection between the body and the shafts, whereby said body may be pulled forward on an upgrade to impose the weight on the horse's back, substantially as herein described.

7. In a two-wheeled vehicle, the axle, the body, and a swinging connection between them, whereby the body may have a movement forward and back, and the shafts clipped to the axle and having a cross-bar, in combination with the adjustable strap connecting the body with the cross bar of the shafts, whereby the body may be pulled forward on an upgrade to impose the weight on the horse's back, substantially as herein described.

8. In a two-wheeled vehicle, the axle, the shafts clipped thereto and having a cross-bar, and the body, in combination with the half-springs clipped to the axle, the half-springs supporting the body, and the pivoted hangers connecting the ends of the springs, whereby the body may have a movement forward and back, and the adjustable strap connecting the body with the cross-bar of the shafts, whereby said body may be pulled forward on an upgrade to impose the weight on the horse's back, substantially as herein described.

9. In a two-wheeled vehicle, the crank-axle and the shafts solidly clipped thereto, in combination with the rod or link journaled or pivoted on the crank portion of the axle and fitted through a socket on the shaft, and nuts for adjusting the rod or link as to length between connections, whereby the height of the shafts may be regulated to suit the horse, substantially as herein described.

In witness whereof I have hereunto set my hand.

PETER GLASZER.

Witnesses:
 J. F. SCAMMAN,
 WALTER RUTHERFORD.